United States Patent
Anderegg et al.

(10) Patent No.: US 11,059,130 B2
(45) Date of Patent: Jul. 13, 2021

(54) DEVICE FOR GENERATING A JET OF LIQUID

(71) Applicant: SYNOVA SA, Duillier (CH)

(72) Inventors: Ludovic Anderegg, Villars-Sainte-Croix (CH); Ronan Martin, Ecublens (CH); Helgi Diehl, Morges (CH); Bernold Richerzhagen, Saint-Sulpice (CH)

(73) Assignee: SYNOVA SA, Duillier (CH)

( * ) Notice: Subject to any disclaimer, the term of this patent is extended or adjusted under 35 U.S.C. 154(b) by 195 days.

(21) Appl. No.: 16/333,655

(22) PCT Filed: Oct. 3, 2017

(86) PCT No.: PCT/EP2017/075071
§ 371 (c)(1),
(2) Date: Mar. 15, 2019

(87) PCT Pub. No.: WO2018/065410
PCT Pub. Date: Apr. 12, 2018

(65) Prior Publication Data
US 2019/0255651 A1 Aug. 22, 2019

(30) Foreign Application Priority Data
Oct. 3, 2016 (EP) .................................. 16192064

(51) Int. Cl.
*B23K 26/14* (2014.01)
*B23K 26/02* (2014.01)
(Continued)

(52) U.S. Cl.
CPC .......... *B23K 26/146* (2015.10); *B23K 26/702* (2015.10)

(58) Field of Classification Search
CPC ................. B23K 26/02; B23K 26/035; B23K 26/04–043; B23K 26/702–704; B23K 26/14; B23K 26/1462; B23K 26/1476
See application file for complete search history.

(56) References Cited

U.S. PATENT DOCUMENTS

| 4,952,771 A | 8/1990 | Wrobel | |
|---|---|---|---|
| 2006/0108341 A1* | 5/2006 | Alips | B23K 26/146 219/121.84 |

(Continued)

FOREIGN PATENT DOCUMENTS

| CN | 102248294 A | 11/2011 |
|---|---|---|
| DE | 3643284 C2 | 9/1988 |

(Continued)

*Primary Examiner* — Michael A Laflame, Jr
(74) *Attorney, Agent, or Firm* — Birch, Stewart, Kolasch & Birch, LLP

(57) ABSTRACT

The present application relates to a device for generating a jet of liquid propagating along a jet axis, said jet of liquid guiding a laser beam. The device comprises a wall element having a central opening, wherein a nozzle holder comprising a nozzle and a window element comprising the window are arranged one above the other within said central opening, said nozzle holder and said window element being spaced from each other along said jet axis, said spacing defining an acceleration chamber, wherein said connection passage and said distribution chamber are formed within said nozzle holder.

8 Claims, 7 Drawing Sheets

(51) Int. Cl.
*B23K 26/146* (2014.01)
*B23K 26/70* (2014.01)

(56) References Cited

U.S. PATENT DOCUMENTS

| | | |
|---|---|---|
| 2009/0045177 A1 | 2/2009 | Koseki et al. |
| 2010/0207038 A1* | 8/2010 | Sharp .................. B23K 26/146 |
| | | 250/492.1 |
| 2012/0152919 A1 | 6/2012 | Muratsubaki et al. |
| 2016/0129527 A1* | 5/2016 | Moon .................... B23K 26/38 |
| | | 425/174.4 |
| 2018/0186082 A1* | 7/2018 | Randhawa ............. B33Y 50/02 |

FOREIGN PATENT DOCUMENTS

| | | |
|---|---|---|
| EP | 0515983 A1 | 12/1992 |
| WO | WO 95/32834 A1 | 12/1995 |
| WO | WO 99/56907 A1 | 11/1999 |

\* cited by examiner

DEVICE FOR GENERATING A JET OF LIQUID

TECHNICAL FIELD

The invention relates to a device for generating a jet of liquid propagating along a jet axis, said jet of liquid guiding a laser beam.

BACKGROUND ART

Material machining using laser radiation is used in a very wide variety of ways for cutting, drilling, milling, welding, marking and generally for removing material. To make it possible to commence removal of material, a predetermined intensity of the radiation has to be reached on the material surface which is to be machined. This high radiation intensity used to be achieved by focusing the laser radiation at the focal point. However, a drawback of this technique is the small axial extent of the focal point (beam width) in which this high intensity was reached. This axial extent is linked to the Rayleigh length. If deep cuts or holes are to be made, the location of the focal point has to be adapted with a high level of accuracy or even tracked. The beam tapers conically toward the focal point, meaning that particularly in the case of deep cuts, starting on the surface it was always necessary to remove sufficient amounts of material for the conical beam to be able to reach the machining location. However, deep cuts or holes always have to be made with inclined side walls.

To avoid having to track the focal point and to be able to make narrow cuts and holes with approximately vertical side walls, it has been proposed in EP A 0 515 983, DE A 36 43 284 and WO 95/32834, to inject laser radiation into a liquid jet, as a light conductor, which is directed on to the workpiece to be machined.

In DE A 36 43 284, the laser radiation was supplied by means of a glass fiber. The end of this glass fiber had a water jet which was directed onto the workpiece to be machined flowing around it. The known device had the drawback that the diameter of the water jet was never allowed to be smaller than that of the glass fiber carrying the laser radiation. A further drawback resulted from a region of dead water beneath the end of the glass fiber, causing, among other things, disturbances in the water jet flow and ultimately leading to this jet rapidly breaking down into drops.

EP A 0 515 983 has attempted to avoid these drawbacks by designing an optics unit with a nozzle block which shapes the water jet. Upstream of the nozzle which shapes the water jet was a water retention chamber having a water inlet and a focusing lens, which closes off the chamber from the nozzle entry, for focusing the laser radiation. The location and focal length of the focusing lens were selected in such a manner that the focal point of the laser radiation was located in the axial center inside the nozzle channel. In operation during machining, it has been found that the nozzle was very quickly damaged by the laser radiation, and consequently the shaping of the radiation was no longer perfect.

An improvement to the way in which the laser beam is injected into the liquid jet was made in WO 95/32834, in which the focal point of the laser radiation to be injected was placed in the plane of the nozzle opening and the water retention chamber in front of the nozzle opening was eliminated. Even with this arrangement, the nozzle was damaged during operation for the machining of material.

WO 99/56907 has attempted to create a material machining device which ensures a prolonged running time, especially by avoiding any damage to the nozzle block which shapes the liquid jet during operation. This is ensured by focusing the radiation injected into the liquid jet into an entry plane of the nozzle channel which shapes the liquid and by supplying the liquid to the nozzle entry flowing at a high velocity (without liquid retention spaces) and without turbulence. By providing a sharp-edged design on the edge of a nozzle channel opening, formation of turbulence is suppressed, yielding a liquid jet of great length. The liquid is supplied to the nozzle channel via a narrow, disk-like inner space, wherein twenty feed lines open into the disk-like inner space in a star-shaped arrangement radial with respect to the jet axis of the nozzle. The disk-like inner space has a low height to provide a high flow velocity to the liquid. The diameter of the disk-like inner space is smaller than the diameter of said feed lines.

SUMMARY OF THE INVENTION

It is the object of the invention to create a device pertaining to the technical field initially mentioned, that allows increasing the working distance of the jet of liquid, i.e. the distance within which the liquid remains in a coherent stream with a substantially constant diameter.

The solution of the invention is specified by the features of claim 1. According to the invention the device for generating a jet of liquid propagating along a jet axis, said jet of liquid guiding a laser beam, comprises a distribution chamber with at least one inlet and at least one outlet for the liquid. Said distribution chamber is of an annular shape encircling said jet axis and has a first effective liquid flow cross-section area S1. Further, the device comprises an acceleration chamber having at least one inlet and one outlet for the liquid as well as a window transparent to said laser beam to introduce said laser beam into said acceleration chamber through said window. The window is arranged in line with the jet axis to enable the introduction of the laser beam coaxial to said jet axis. The acceleration chamber has an entrance cross-section defined by a surface area of a cylinder barrel of a geometric cylinder arranged coaxially to the jet axis. The barrel has a radius r corresponding to the smallest distance between the jet axis and said at least one inlet of the acceleration chamber, wherein said area of the cylinder barrel being located within said acceleration chamber. A nozzle with a nozzle hole generating said jet of liquid is arranged in said outlet of the acceleration chamber. Said nozzle hole defines a direction of the jet axis. Additionally, a connection passage extends from the at least one outlet of the distribution chamber to the at least one inlet of the acceleration chamber, wherein said connection passage has a second effective liquid flow passage cross-section area S2. The second effective liquid flow cross-section area S2 is smaller than the first effective liquid flow cross-section area S1, preferably by an order of magnitude (S2/S1<<1) whereas the second maximum liquid flow cross-section area S2 is smaller than the entrance cross-section S3 (S2/S3<1). The device comprises a wall element having a central opening, wherein a nozzle holder comprising the nozzle and a window element comprising the window are arranged one above the other within said central opening. The nozzle holder and the window element are spaced from each other along the jet axis, said spacing defining the acceleration chamber. The connection passage and the distribution chamber are formed within the nozzle holder.

By providing a second effective liquid flow cross-section area which is smaller than the first effective liquid flow cross-section area, the speed vectors of a liquid flowing from said distribution chamber through the connection passage are all oriented in an axially symmetrical fashion and have the same absolute value. This results in a reduction of turbulences in the liquid, specifically within the third chamber into which it is flowing to. This leads to a laminar flow of the liquid within said third chamber which results in an increase of the working distance of the jet of liquid. Provision of the device in only three parts, which may easily and quickly be assembled and disassembled, facilitates cleaning and maintenance operation on the device as well as replacement of parts.

With the device according to the present invention, a laser beam is being coupled into a jet of liquid. The jet of liquid thereby acts as light conductor to guide the laser beam onto a workpiece by means of total internal reflection, whereby the diameter of the laser beam remains constant over the entire working length of the jet of liquid. This allows the cutting of materials, like metals, ceramics or semiconductors with a well-defined and constant diameter. The laser beam is generated by an appropriate high power laser, such as a Nd:YAG laser. The laser beam is then directed by means of optical elements, such as lenses or mirrors into the jet of liquid.

In the following application, the "working distance" of a jet of liquid is the distance, within which the liquid remains in a coherent stream with a substantially constant diameter. After said working distance, the jet of liquid has the tendency to break down into drops.

The distribution chamber has an annular shape, wherein the term "annulus" is used in the mathematical context, i.e. an annulus is a region bounded by two concentric circles. Further, the distribution chamber has an extension in a third dimension such as to enclose a volume into which the liquid may flow. As the distribution chamber is coaxial with the jet axis, the circles defining the annular shape have centres which are identical with the jet axis. The extension in the third dimension of the distribution chamber is therefore oriented in a direction which is parallel to the jet axis. Said third dimension is referred to as "height" of the distribution chamber throughout this application.

Preferably, the radii of the two concentric circles are constant along the entire height of the distribution chamber. This leads to a rectangular cross-section of the distribution chamber in a plane which has a normal vector perpendicular to the jet axis and within which said jet axis is lying. In three dimensions, the distribution chamber would hence have the shape of a cylinder of rotation with a first diameter with a cut out cylinder of rotation with a second, smaller diameter.

Alternatively, said distribution chamber may have other cross-sections in said plane, such as e.g. round, ellipsoid or polygonal, i.e. the radii of said two concentric circles vary over the height of the distribution chamber. In the case of a round or ellipsoid cross-section, the three-dimensional form of the distribution chamber would hence be toroidal.

Preferably said liquid is water.

In the present application the "first effective liquid flow cross-section area" is a surface area lying within said distribution chamber and being a cross-section area of said distribution chamber and a surface of a body of revolution defined by a first vector rotated about the jet axis around 360°, wherein said first vector fulfils the following conditions:

the first vector is perpendicular to a flow direction vector of the liquid flow through said at least one outlet of the distribution chamber;

the first vector lies in a plane which includes said jet axis;

said first vector has a magnitude which corresponds to a maximum dimension of the cross-section of the distribution chamber in the direction of the first vector within said plane which includes said jet axis.

The flow direction vector through the at least one outlet of the distribution chamber indicates the flow direction of the liquid through said at least one outlet of the distribution chamber directly at the transition between the distribution chamber and the at least one outlet of the distribution chamber. Usually, said outlet will be arranged on a surface defining a wall of said distribution chamber. Hence, the flow direction vector indicates the flow direction of the liquid at the location where said outlet is arranged in said wall. In the case that the flow of liquid through said at least one outlet of the distribution chamber comprises multiple liquid flow vectors, e.g. because the at least one outlet of the distribution chamber has rounded edges, the flow direction vector is taken as an average of the sum of all liquid flow vectors.

In a preferred embodiment, said at least one outlet of the distribution chamber leads the liquid axially, i.e. parallel to the jet axis, out of said distribution chamber. As the flow direction vector is parallel to the jet axis, said first vector is perpendicular to said jet axis. The magnitude of said first vector corresponds to the maximal dimension of the distribution chamber in a direction perpendicular to the jet axis and lying within the plane including said jet axis. As the distribution chamber is of an annular shape being concentric with the jet axis in this embodiment, the magnitude of the first vector corresponds to the maximal difference between an outer radius and an inner radius of said annular distribution chamber. The rotation body of said first vector is an annulus.

In the case that the distribution chamber is in the form of a hollow cylinder, i.e. the radii of the annulus are constant over the height of the distribution chamber, the first effective liquid flow cross-section area is equal to the base area of the hollow cylinder.

In another embodiment, said at least one outlet of the distribution chamber leads the liquid radially, i.e. perpendicular to said jet axis, out of the distribution chamber. As the flow direction vector is perpendicular to the jet axis, said first vector is hence parallel to said jet axis. The magnitude of said first vector corresponds to the maximal dimension of the distribution chamber in a direction parallel to the jet axis and lying within the plane including said jet axis. Therefore, the magnitude of the first vector corresponds to the maximal height of the distribution chamber. The rotation body of said first vector is a cylinder barrel lying within said distribution chamber. In this embodiment, the first effective liquid flow cross-section area equals the surface of the cylinder barrel. Said cylinder barrel has the smallest possible radius, meaning that its radius is given at the radial position of the first vector.

In a further embodiment, the at least one outlet of the distribution chamber may be arranged at an angle relative to said jet axis. In this case, the rotation body is a frustum lying within said distribution chamber. The first effective liquid flow cross-section area is then equal to the surface of said frustum.

Preferably, all outlets of the distribution chamber are rotation symmetric to each other around the jet axis. In this case, the rotation body derived from the flow direction vector of the liquid flow through one of said outlets is equal to the rotation body derived from the flow direction vector of any other of the further outlets of the distribution chamber. Hence, the first effective liquid flow cross-section area may be determined on the basis of any one of the outlets of the distribution chamber.

"Rotation symmetric" as understood herein is the arrangement of the outlets of the distribution chamber such that any two of said outlets are congruent to each other after a rotation about a partial turn around the jet axis. Preferably, the outlets are arranged in a regular pattern, i.e. any outlet is congruent to its neighbouring outlets after a defined partial turn around the jet axis.

Preferably, the distribution chamber is shaped such that the maximal dimension in the direction of the first vector is as close as possible to the at least one outlet of the distribution chamber. This ensures a very effective reduction of turbulence in the acceleration chamber.

In a preferred embodiment, said at least one outlet of the distribution chamber is configured as a single annular slot in a surface of said distribution chamber, said annular slot extending around 360° around the jet axis. In an alternative embodiment, the distribution chamber comprises a multitude of outlets in the form of circles or circle sectors, preferably half circles, which are arranged on the same surface of said distribution chamber. Preferably, said multitude of outlets of the distribution chamber are all arranged in a circular way around said jet axis, preferably in a rotation symmetric way. Preferably, each outlet of the multitude of outlets of the distribution chamber is spaced from neighbouring outlets by a defined distance, i.e. each outlet of the distribution chamber is arranged at a defined angle relative to the jet axis in relation to neighbouring outlets. In one embodiment, the multitude of outlets of the distribution chamber may be arranged so closely together that their circumferences touch each other.

The acceleration chamber preferably has a disc shape. The window is preferably arranged in one of the bases of the disc, while the at least one inlet of the acceleration chamber is arranged at a radial position of said disc shape, either on one of the bases of the disc shape or on a lateral surface thereof. The window is made of any suitable material which is transparent to the laser beam used and which is able to withstand the liquid pressure within said acceleration chamber. The at least one window is arranged such that the jet axis passes through said window, such that the laser beam may be lead into said acceleration chamber through said window along said jet axis.

The acceleration chamber is preferably coaxial to the jet axis, i.e. a centre of a disc like acceleration chamber is located on said jet axis.

Preferably, said acceleration chamber is located at a different position along the jet axis as said distribution chamber, e.g. above or below said distribution chamber, if the jet axis is aligned to be vertical. In the present application, the term "vertical" defines a direction in space which is parallel to the direction of earth gravity. This configuration allows saving lateral space, as both chambers are arranged on top of each other rather than next to each other.

Alternatively, said distribution chamber and said acceleration chamber are coaxial to each other, i.e. the acceleration chamber is arranged within the centre of the annular shape of the distribution chamber.

The acceleration chamber has an entrance cross-section S3 defined by a surface area of a cylinder barrel of a geometric cylinder arranged coaxially to the jet axis. The radius of the geometric cylinder equals the distance between the jet axis and the at least one inlet of the acceleration chamber, which is located closest to said jet axis in a plane including said jet axis. In principle, the cylinder barrel has a surface area which corresponds to $2\pi rh$, wherein r is the distance between the jet axis and the inlet of the acceleration chamber which is closest to said jet axis, and wherein h is the dimension of the acceleration chamber in a direction parallel to the jet axis, i.e. the height of the disc for a disc shaped acceleration chamber.

The outlet of the acceleration chamber is located coaxial to said jet axis. In the case of a disc shaped acceleration chamber, said outlet is hence also coaxial with the centre of a base of the disc shape.

The liquid flows into said acceleration chamber through said at least one inlet of the acceleration chamber and will flow to the outlet of said acceleration chamber. As the volume available for the liquid flow decreases towards the outlet in function of the decreasing distance to the jet axis, the velocity of said liquid flow will increase. Hence, the liquid is accelerated within the acceleration chamber towards the outlet.

While the acceleration chamber may have different shapes, a disc like shape is most preferred, as this yields the highest acceleration with the least disturbance of the liquid flow. Hence, a good acceleration performance may be linked to the necessary maintenance of a laminar flow of the liquid within the acceleration chamber.

Preferably, a disc shaped acceleration chamber includes one annular slot as inlet, said annular slot being arranged on either of the bases of the disc or on a lateral surface thereof. Alternatively, said at least one inlet of said acceleration chamber may be configured as a multiplicity of openings, preferably in the form of circles or circle sectors.

The nozzle is arranged within the outlet of the acceleration chamber. Hence, liquid passing through said outlet will flow to said nozzle. The nozzle has a nozzle hole, which preferably is round in shape. The liquid may flow through said nozzle hole and exit said acceleration chamber. Said nozzle hole generates the jet of liquid and hence defines the orientation of the jet axis. Said nozzle hole is thereby smaller in diameter than said outlet of the acceleration chamber.

Between the at least one outlet of the distribution chamber and the at least one inlet of the acceleration chamber a connection passage is arranged. Preferably, the number of outlets of the distribution chamber matches the number of inlets of the acceleration chamber. In this case, a connection passage is arranged between each outlet of the distribution chamber and each inlet of the acceleration chamber.

The second effective liquid flow cross-section area is the surface area of a plane intersecting said connection passage in a direction perpendicular to the flow direction of the liquid through said connection passage at a location where said cross-section perpendicular to the flow direction is minimal. Hence, the second effective liquid flow cross-section area is the smallest area perpendicular to the flow direction of the liquid within said connection passage. If the device comprises more than one connection passage, then said second effective liquid flow cross-section area is the sum of all cross-section areas perpendicular to the flow direction of the liquid through each connection passage at the respective location, where said section area is smallest for each connection passage.

In the following application, an "order of magnitude" is understood as factor of ten. For example, in a preferred embodiment, the second effective liquid flow cross-section area is at least ten times smaller than the first effective liquid flow cross-section area. More preferably, said second effective liquid flow cross-section area is 20 times smaller than said first effective liquid flow cross-section area.

With the selection of the second effective liquid flow cross-section area smaller than the first effective liquid flow cross-section area, especially by an order of magnitude, the velocity vectors of the liquid within the connection passage satisfy the cylindrical symmetry and have the same norm value, which facilitates a laminar flow with reduced turbulence within the acceleration chamber. With the second effective liquid flow cross-section area being smaller than the entrance cross-section, a laminar flow with almost no turbulence is achieved within said acceleration chamber. This then leads to an increase of the working distance of the jet of liquid compared with prior art nozzle arrangements.

Preferably, the device comprises one wall element having a central opening, wherein the nozzle holder comprising the nozzle and the window element comprising the window are arranged one above the other along said jet axis within said central opening. The nozzle holder and the window element are spaced from each other, said spacing defining the height of said acceleration chamber. The connection passage and the distribution chamber are formed within the nozzle holder.

In a specially preferred embodiment, said distribution chamber and said acceleration chamber are arranged spaced from each other along the jet axis, while the at least one connecting channel is arranged parallel to said jet axis. The cross-section of the distribution chamber is thereby rectangular in a plane parallel to the jet axis and including said jet axis. In this configuration, the first effective liquid flow cross-section area is defined by an annulus having a normal which is parallel to the jet axis. Preferably, the at least one connecting channel has a constant cross-section. The second effective liquid flow cross-section area is thereby equal to a section area of a plane having a normal parallel to said jet axis with said at least one connecting channel.

Preferably, the connection passage is rotationally symmetric relative to the jet axis.

Preferably, the connection passage consists of one annular duct which is coaxial to the jet axis. In this case, the distribution chamber comprises a single outlet in the form of an annular slot and said acceleration chamber comprises a single inlet in the form of an annular slot. Preferably, said annular slot, said outlet of the distribution chamber and said inlet of the acceleration chamber have substantially the same radii and are aligned parallel to said jet axis.

The acceleration chamber preferably has the shape of a circular cylinder having a radius that is greater than a height of the cylinder, wherein said height preferably is <1 mm. Such a configuration of the acceleration chamber ensures a maximal acceleration of the liquid towards the outlet of said acceleration chamber and hence towards the nozzle.

Alternatively, the connection passage consists of at least two ducts having substantially the same shape and dimensions. By providing ducts with substantially the same shape and dimension it is ensured that the velocity vectors of the liquid passing through said at least two ducts have the same norm value. This reduces the occurrence of turbulence within the acceleration chamber, as the liquid flowing into the acceleration chamber will have a uniform velocity.

Preferably, the distribution chamber has one inlet. Preferably, said at least one inlet of the distribution chamber for the liquid is arranged on a tangential position on a surface of said distribution chamber, wherein the liquid is injected through said at least one inlet of the distribution chamber into the distribution chamber in a direction generally towards said jet axis.

Alternatively, the distribution chamber may comprise more than one inlet of the distribution chamber, such as two, three, four or more inlets of the distribution chamber. The at least one inlet of the distribution chamber is preferably coupled to a liquid supply which allows the supply of liquid with a defined liquid flow and/or a defined pressure into said distribution chamber.

However, provision of only one inlet of the distribution chamber reduces the complexity of the device, as only one liquid supply or connection tube to a liquid supply needs to be connected with the distribution chamber.

The window is preferably a transparent element forming at least a part of a wall of the acceleration chamber. This allows a simple overall configuration of the acceleration chamber.

Other advantageous embodiments and combinations of features come out from the detailed description below and the totality of the claims.

BRIEF DESCRIPTION OF THE DRAWINGS

The drawings used to explain the embodiments show.

In the figures, the same components are denoted by the same reference symbols.

PREFERRED EMBODIMENTS

Figure 1:
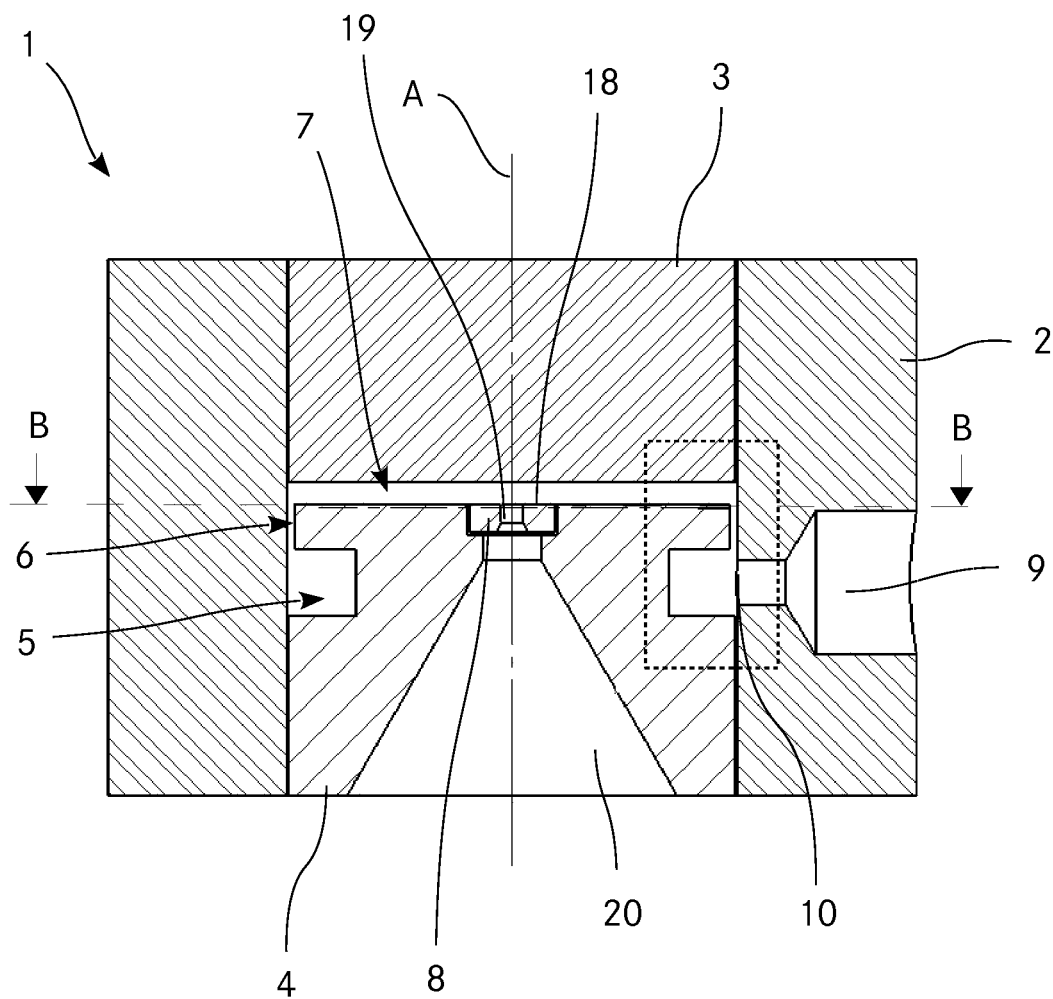
FIG. 1 A cross-section through a first embodiment of a device according to the present invention.

FIG. 1 shows a cross-section through a first embodiment of a device 1 for generating a jet of liquid according to the present invention. The device 1 comprises a wall element 2 with a central opening. Within said central opening, a window element 3 and a nozzle holder 4 are arranged. In the embodiment shown, the wall element 2 is in the shape of a full cylinder with a cut off of a full cylinder with a smaller radius. Accordingly, the window element 3 and the nozzle holder 4 are in the form of cylinders which may be affixed within the central opening of the wall element 2.

The nozzle holder 4 comprises an outlet 18 of the acceleration chamber 7. A nozzle 8 is arranged within said outlet 18. The nozzle 8 comprises a nozzle hole 19 which creates a jet of liquid which propagates along a jet axis A. The jet axis A thereby marks the centre of the jet of liquid. Note that the nozzle hole 19 has a round shape which yields a jet of liquid having a generally round cross-section. The window element 3 is made of a material which is transparent to laser radiation, such that a laser beam (not shown) may pass trough said window element 3 along the jet axis A. The laser beam is generated by a laser and guided towards said window element 3 and aligned to the jet axis A by means of optic elements as is known in the art.

The device 1 further comprises a liquid supply connection 9 with which the device may be connected to a liquid supply unit, such as a pump, duct or the like. By means of said liquid supply connection 9 a liquid may be supplied to the device with a determined pressure and/or with a determined flow rate. In the embodiment shown, the liquid supply connection is located in said wall element 2.

The liquid supply connection 9 is in open communication with a distribution chamber 5. The distribution chamber 5 is in the form of an annulus extending around the jet axis A. In the embodiment shown, the distribution chamber 5 has a rectangular cross-section in a plane including said jet axis A. In the figure, this plane corresponds to the plane of the paper. The distribution chamber 5 serves to distribute the liquid supplied to the device through the liquid supply connection 9 symmetrically around the jet axis A.

Further, the device 1 comprises an acceleration chamber 7 which is located between said window element 3 and said nozzle holder 4 including nozzle 8. The acceleration chamber 7 has a disc shape and extends around said jet axis A. Liquid flows from said distribution chamber 5 into said acceleration chamber 7 through a connecting channel 6, which in the embodiment shown is configured as annular slot extending around said jet axis A.

Further, the nozzle holder 4 comprises a conical opening 20 below said nozzle 8 in propagation direction of said jet of liquid. This conical opening 20 allows the jet of liquid to propagate without any device generated disturbance out of said device 1.

The distribution chamber 5 as well as the connection passage 6 are formed within the nozzle holder 4.

Figure 2:
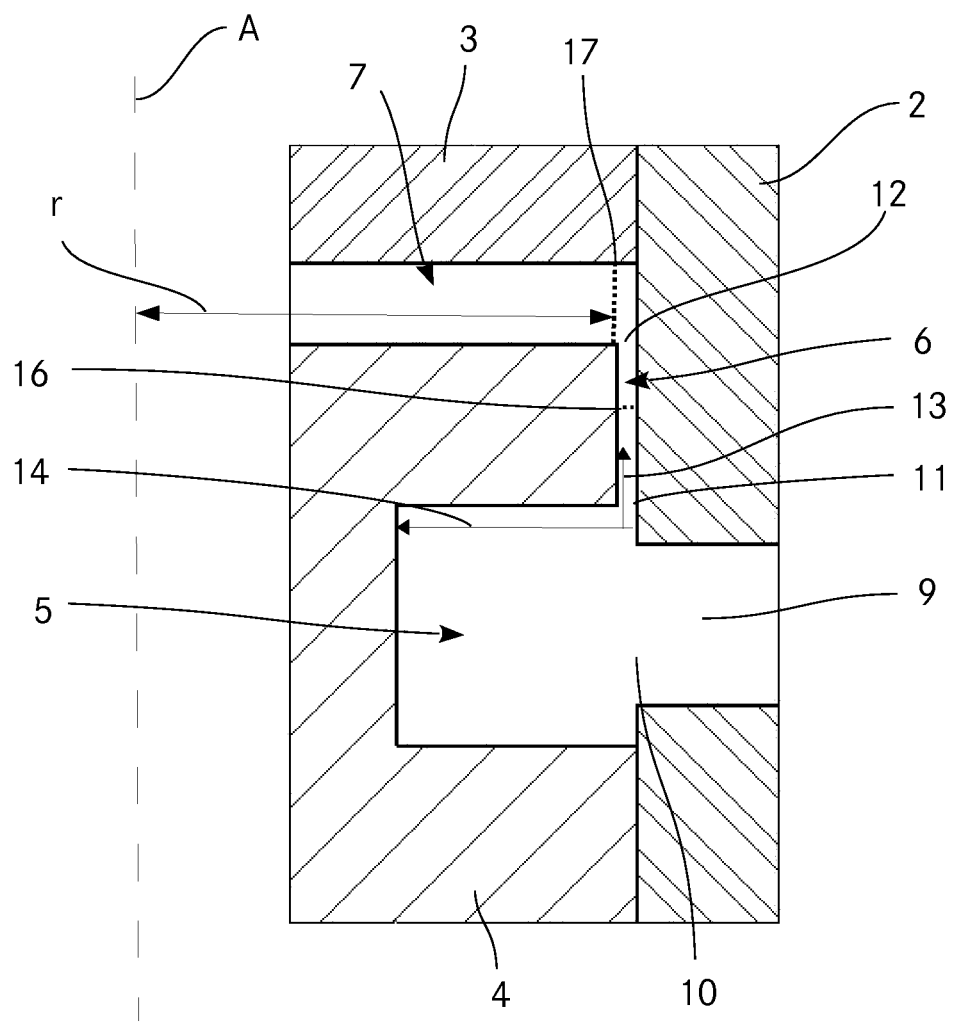
FIG. 2 a detailed view of a section of the device shown in FIG. 1.

FIG. 2 is a detailed view of a section of the device 1 according to FIG. 1. Said section is marked in FIG. 1 by a rectangle with dashed lines. In this detailed view, it may be seen that the liquid supply connection 9 abuts into the distribution chamber 5 by means of an inlet 10. Further, said distribution chamber 5 has an outlet 11 which connects said distribution chamber 5 openly with the connection passage 6. Said connection passage 6 abuts into the acceleration chamber 7 by means of an inlet 12.

The distribution chamber 5 has a first effective liquid flow cross-section area S1 which equals the surface of a rotation body 15 (see FIG. 3) defined by a first vector 14. Said first vector 14 is perpendicular to a flow direction vector 13 of the liquid through said outlet 11 of the distribution chamber 5 and spans in a plane comprising said jet axis A. The first vector has a magnitude which corresponds to a maximum dimension of the cross-section of the distribution chamber 5 in the direction of the first vector 14. As the distribution chamber 5 has a rectangular cross-section in the plane defining the orientation of said first vector 14, the dimension used to define the magnitude of said first vector 14 is identical at any position within said plane.

The connection passage 6 has a second effective liquid flow cross-section area S2 which corresponds to the surface of intersection between a plane having a normal vector which is parallel to the flow direction vector 13 of the liquid within said connection passage 6 at a location where a cross-section of said connecting channel 6 within said plane is minimal and said connecting channel 6. I.e. the second effective liquid flow cross-section area S2 corresponds to the smallest area perpendicular to the flow direction of the liquid within said connection passage 6.

Figure 10:
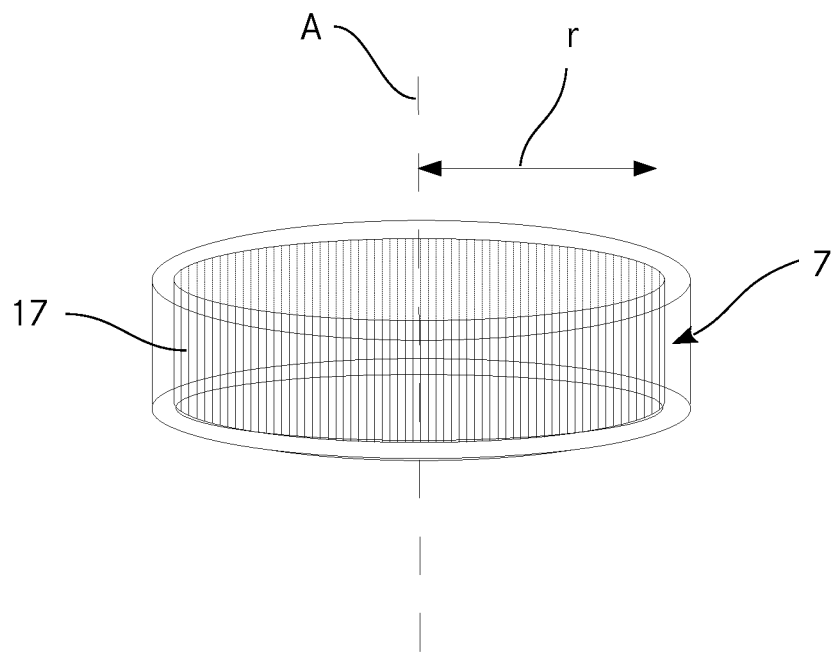
FIG. 10 a three-dimensional schematic representation of the entrance cross-section area S3 of the acceleration chamber.

The acceleration chamber 7 has an effective entry cross-section S3 defined by a surface area of a cylinder barrel 17 of a geometric cylinder arranged coaxially to the jet axis A. The cylinder barrel 17 has a radius r corresponding to the smallest distance between the jet axis A and the inlet 12 of the acceleration chamber 7, said area of the cylinder barrel being located within said acceleration chamber 7. A schematic representation of said cylinder barrel 17 is shown in FIG. 10.

Figure 3:
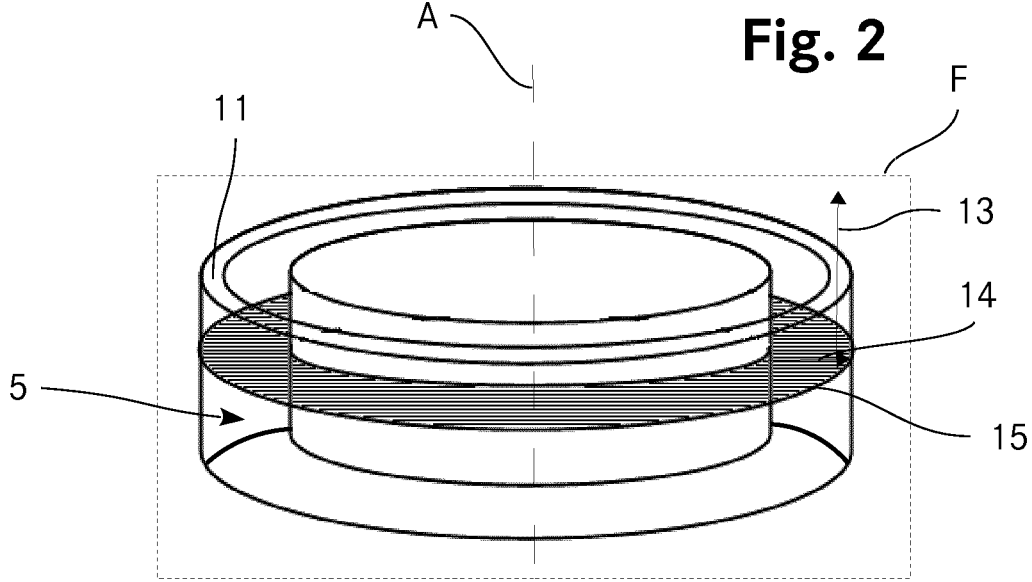
FIG. 3 a three-dimensional schematic representation of the first effective liquid flow cross-section area of the embodiment according to FIG. 1.

FIG. 3 is a three dimensional schematic representation of the first effective liquid flow cross-section area S1 of the embodiment of the device as shown in FIG. 1. In this figure, the annular shape of the distribution chamber 5 may be clearly seen. The outlet 11 of the distribution chamber is in the shape of an annular slot located about an outer radius of said annular distribution chamber 5. In this embodiment, the flow direction vector 13 through said outlet 11 of the distribution chamber 5 is parallel to the jet axis A. The first vector 14 lies perpendicular to said flow direction vector 13 within a plane F which includes said jet axis A. The magnitude of the first vector 14 corresponds to the maximum dimension of the distribution chamber 15 within said plane F. The first effective liquid flow cross-section area S1 is obtained by the surface area of a rotation body 15 generated by a full rotation said first vector 14 around the jet axis A. In the embodiment shown, the rotation body 15 is an annulus which has the same surface area as a base surface of distribution chamber 5.

Figure 4:
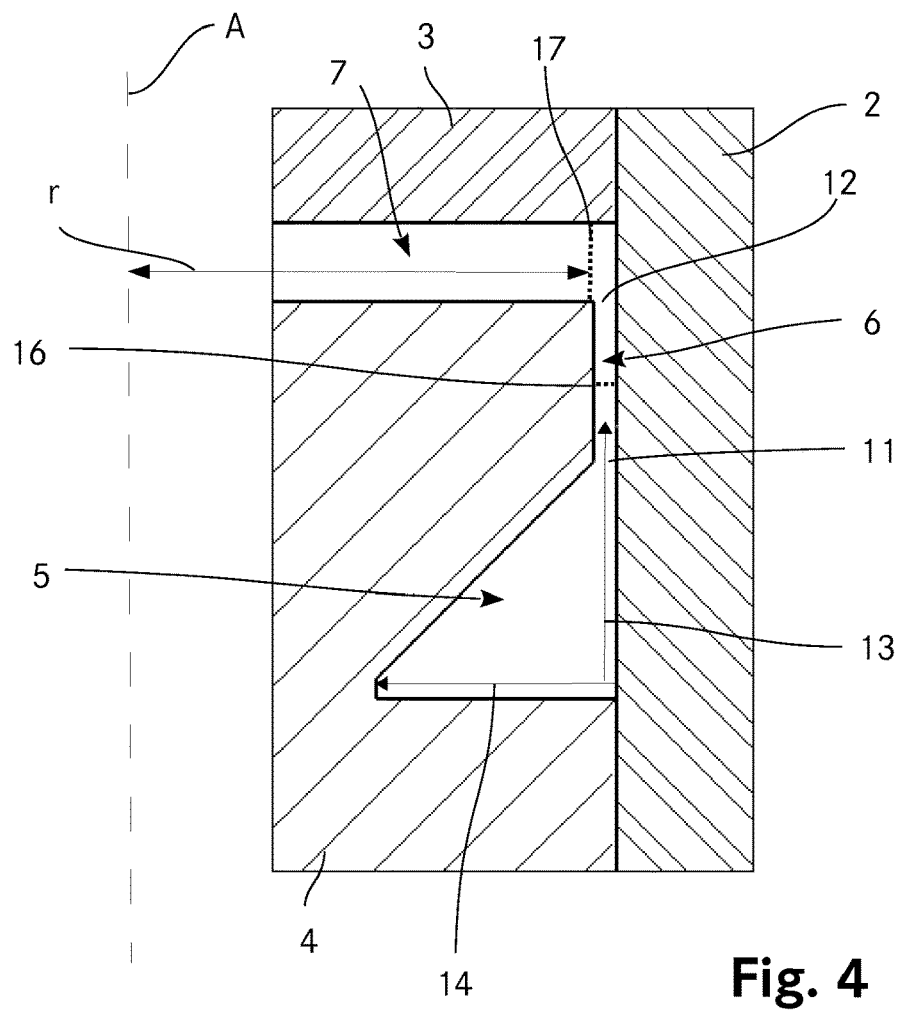
FIG. 4 a detailed view of a cross-section of an alternative embodiment of an inventive device.

FIG. 4 is a detailed view of an alternative embodiment of a device 1 according to the present invention. Compared to the embodiment as shown in FIG. 1, the cross-section of the distribution chamber 5 has a polygonal shape in a cross-section lying in plane F. As is shown in FIG. 4, the magnitude of the first vector 14 equals the maximum dimension of the distribution chamber 5 in said plane in the direction of said first vector 14. As the flow direction vector 13 is parallel to the jet axis A, the resulting rotation body 15 will be an annulus as in the embodiment shown in FIG. 3.

Figure 5:
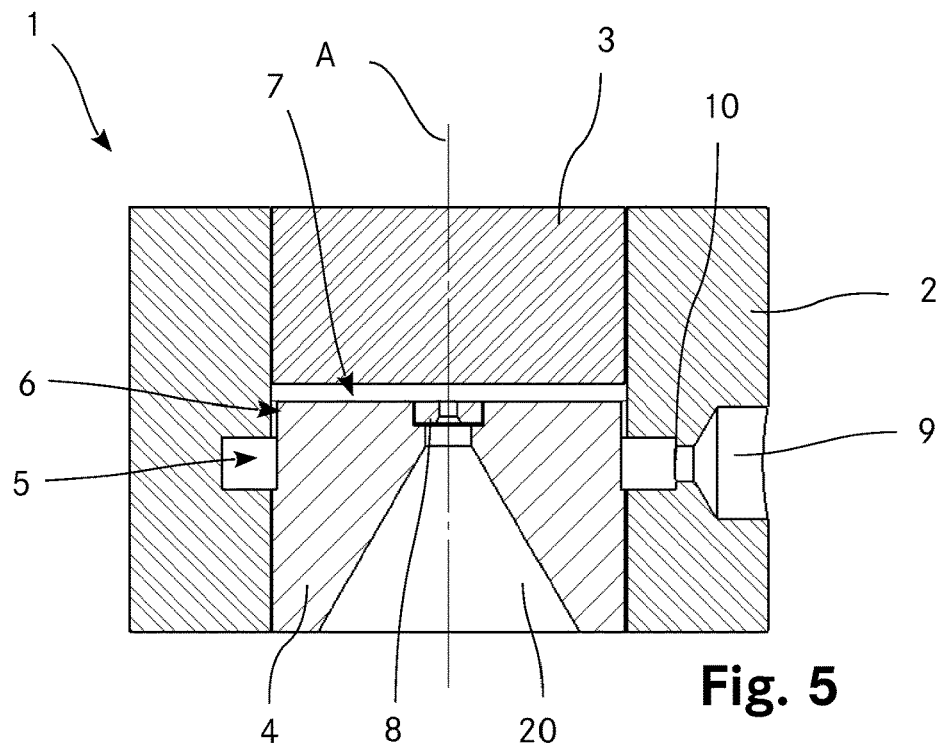
FIG. 5 a cross-section of an alternative embodiment of a device.

FIG. 5 shows a cross-section of an alternative embodiment of a device 1. This embodiment is generally identical with the embodiment as shown in FIG. 1, with the exception of the arrangement of the distribution chamber 5 in the wall element 2. As the connection passage 6 is arranged in said nozzle holder 4, the distribution chamber 5 also extends into the nozzle holder 4, at least to an extent which corresponds to the diameter of the connection passage 6.

Figure 6:
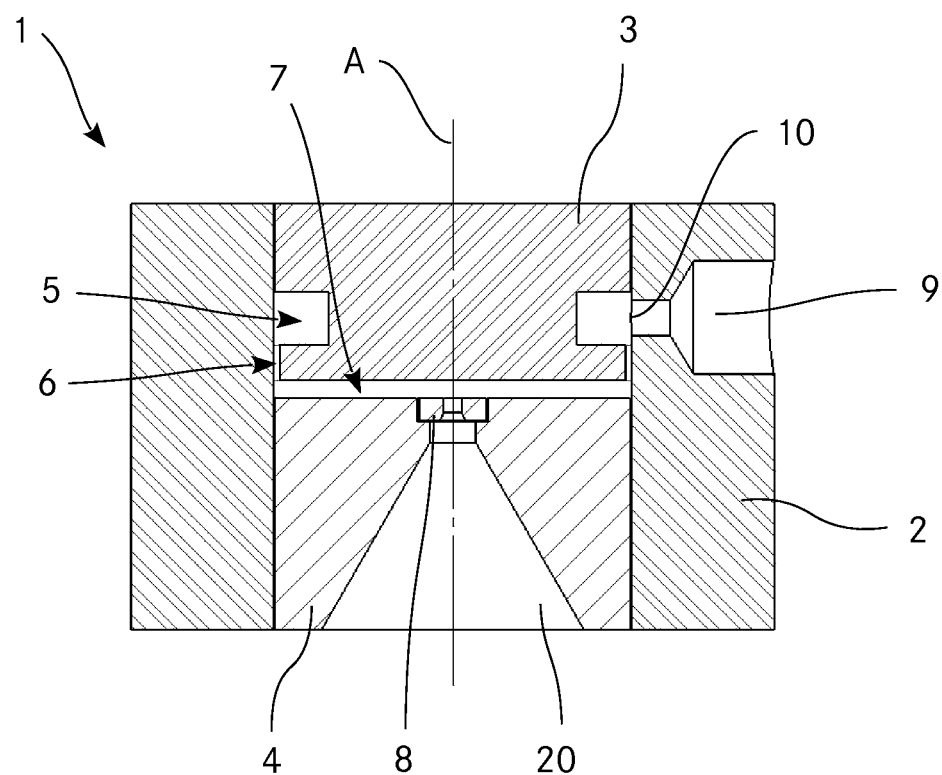
FIG. 6 a cross-section of another alternative embodiment of a device.

FIG. 6 shows yet another alternative embodiment of a device 1. In this embodiment, both the distribution chamber 5 and the connection passage 6 are arranged in said window element 3.

Figure 7:
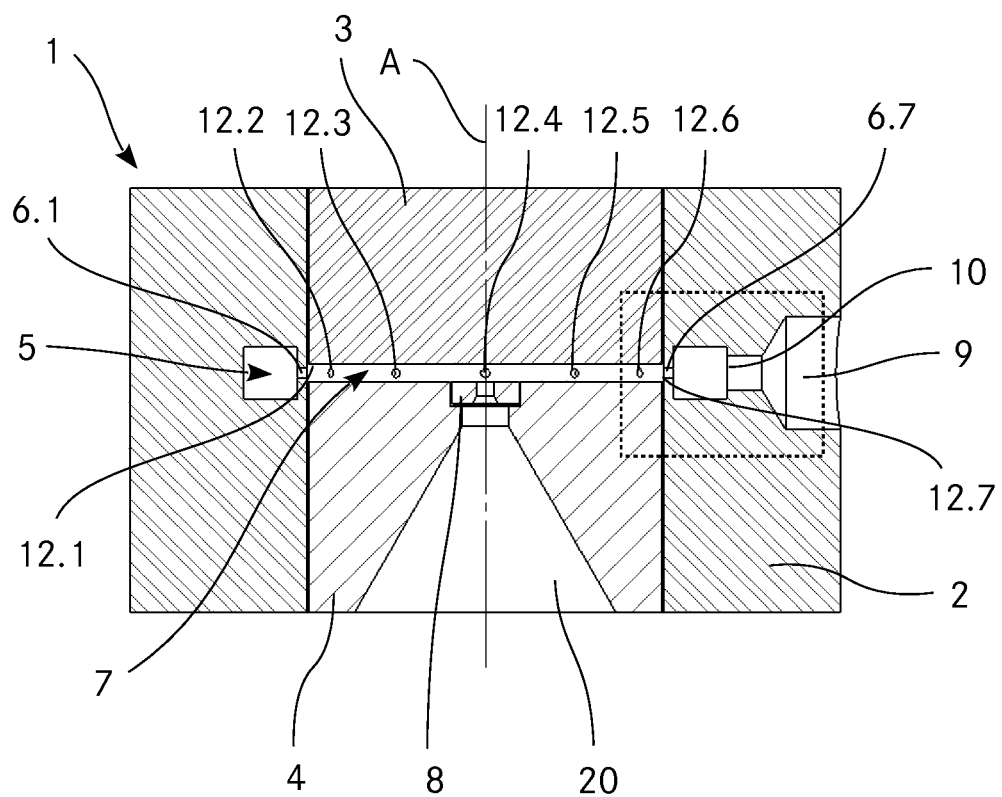
FIG. 7 a cross-section of an alternative embodiment of a device having a multitude of connection passages.

FIG. 7 shows another alternative embodiment of a device 1. In this embodiment, a multitude of connection passages 6.1-6.7 (of which only two connection passages 6.1, 6.7 are shown for perspective reasons) are arranged between said distribution chamber 5 and said acceleration chamber 7.

Consequently, the acceleration chamber 7 has a multitude of inlets 12.1-12.7. In essence, the connection passages 6.1-6.7 are arranged in a spoke-like configuration between said distribution chamber 5 and said acceleration chamber 7. The distribution chamber 5, the connection passages 6.1-6.7 and the acceleration chamber 7 are generally all arranged in the same level about the jet axis A. This has an influence on the orientation of the first effective liquid flow cross-section area S1, as is explained in more detail in connection with FIGS. 8 and 9. Further, it has to be noted that in this embodiment the second effective cross section area S2 is the sum of all cross-section areas 16 perpendicular to the flow direction of the liquid through each connection passage 6.1-6.7 at the respective location, where said section area is smallest for each connection passage 6.1-6.7.

Figure 8:
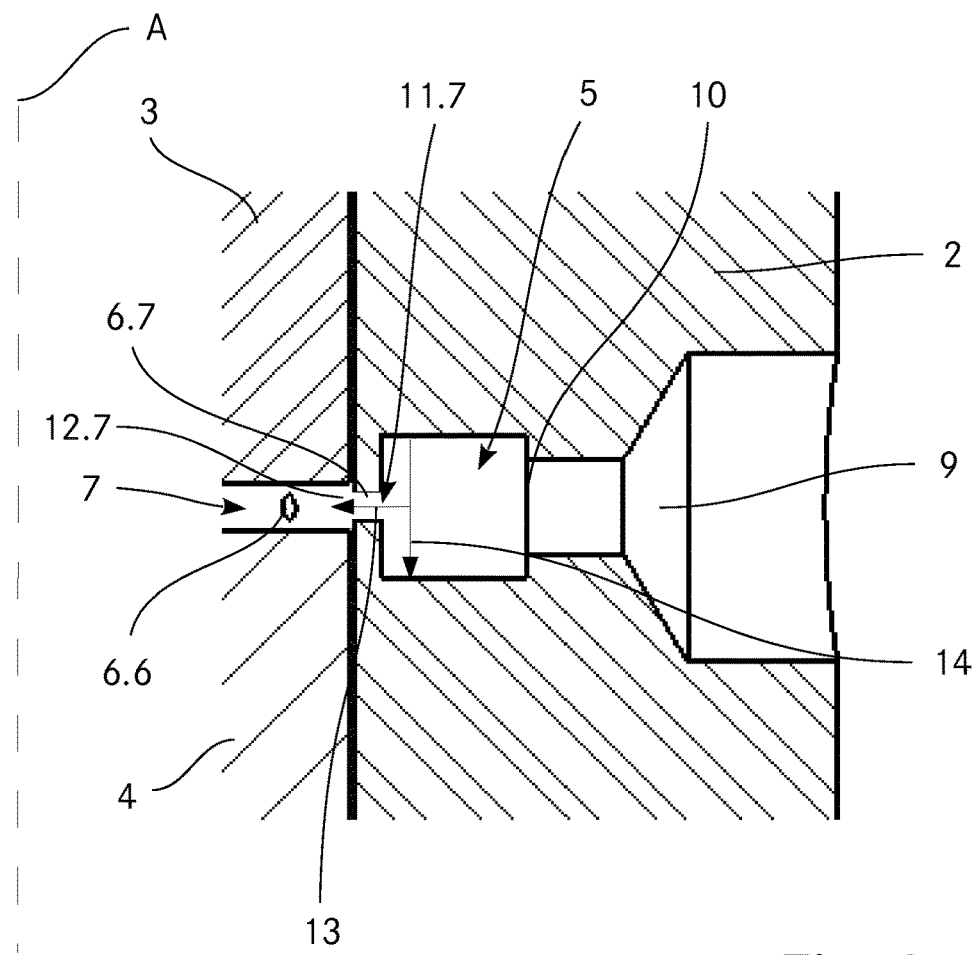
FIG. 8 a detailed view of a section of the device shown in FIG. 7.

FIG. 8 shows a detailed view of a section of the device 1 according to FIG. 7. Said section is marked in FIG. 7 by a rectangle with dashed lines. Compared to the embodiment as shown in FIG. 1, the flow direction vector 13 through the outlets 11.1-11.7 of the distribution chamber 5 lies on the plane F and is perpendicular to the jet axis A. As example, the situation is shown for one outlet 11.7. As the flow direction vector 13 is perpendicular to the jet axis A, the first vector 14 is parallel to said jet axis A.

Figure 9:
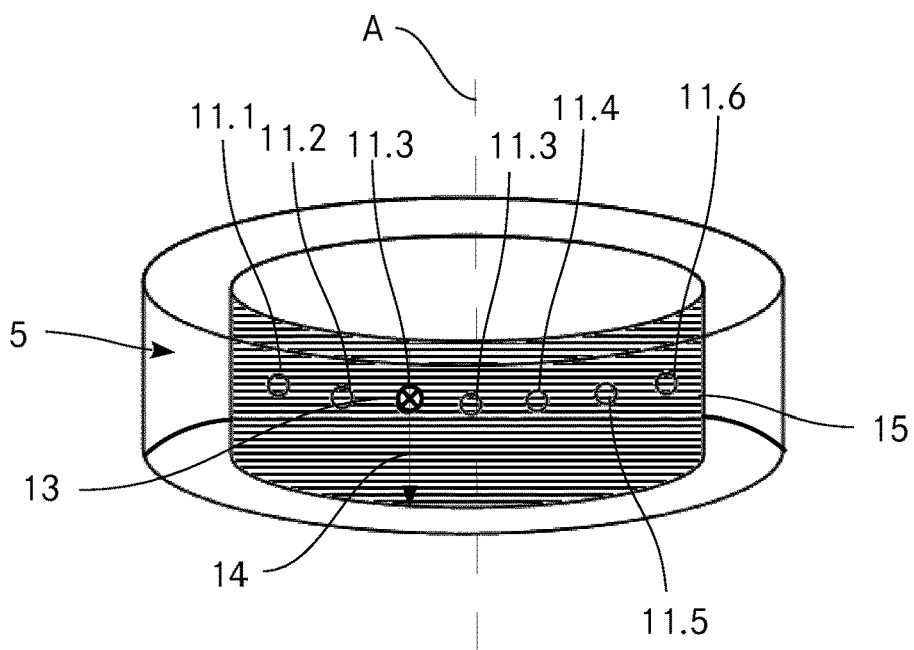
FIG. 9 a three-dimensional schematic representation of the first effective liquid flow cross-section area of the embodiment according to FIG. 7.

As shown in FIG. 9, the resulting rotation body 15 is not an annulus like the rotation body 15 obtained for the embodiment as shown in FIG. 1, but the rotation body 15 is a cylinder barrel. The height of the cylinder and its radius are determined by the maximum dimension of the cross-section of the distribution chamber 5 in the direction of the first vector 14 in the plane F and by the radial position of the first vector 14, respectively. In the embodiment shown, the distribution chamber 5 has a rectangular cross-section in said plane F, i.e. the dimension of the distribution chamber 5 in the direction of the first vector 14 is constant along the entire plane. In this case, the rotation body 15 is generated with a rotation radius which equals the minimal radius between the jet axis A and the first vector 14.

On FIG. 9, the flow direction vector 13 is perpendicular to the outlet 11.1-11.6 of the distribution chamber 5 pointing towards said jet axis A and the first vector 14 accordingly arranged parallel to the jet axis A. The surface area of the rotation body 15 which equals the first effective liquid flow cross-section area S1 is highlighted with stripes in this figure.

FIG. 10 shows a schematic three-dimensional representation of the entrance cross-section S3 of the acceleration chamber 7 which is identical to and is defined by the cylinder barrel 17. The cylinder barrel 17 is arranged within said acceleration chamber 7 coaxial to said jet axis A. The radius r of said cylinder barrel is defined by the minimal distance between said jet axis A and the inlet 12 of said acceleration chamber 7. In the embodiment shown, the inlet 12 of the acceleration chamber 7 is configured as an annular slot. Hence, the minimal distance between the inlet 12 of the acceleration chamber 7 and the jet axis A equals to the inner radius of said annular slot. The surface area of the cylinder barrel 17 and hence the entrance cross-section S3 may be calculated as $2\pi rh$, where h is the height of the acceleration chamber, i.e. its dimension along the jet axis A.

Figure 11:
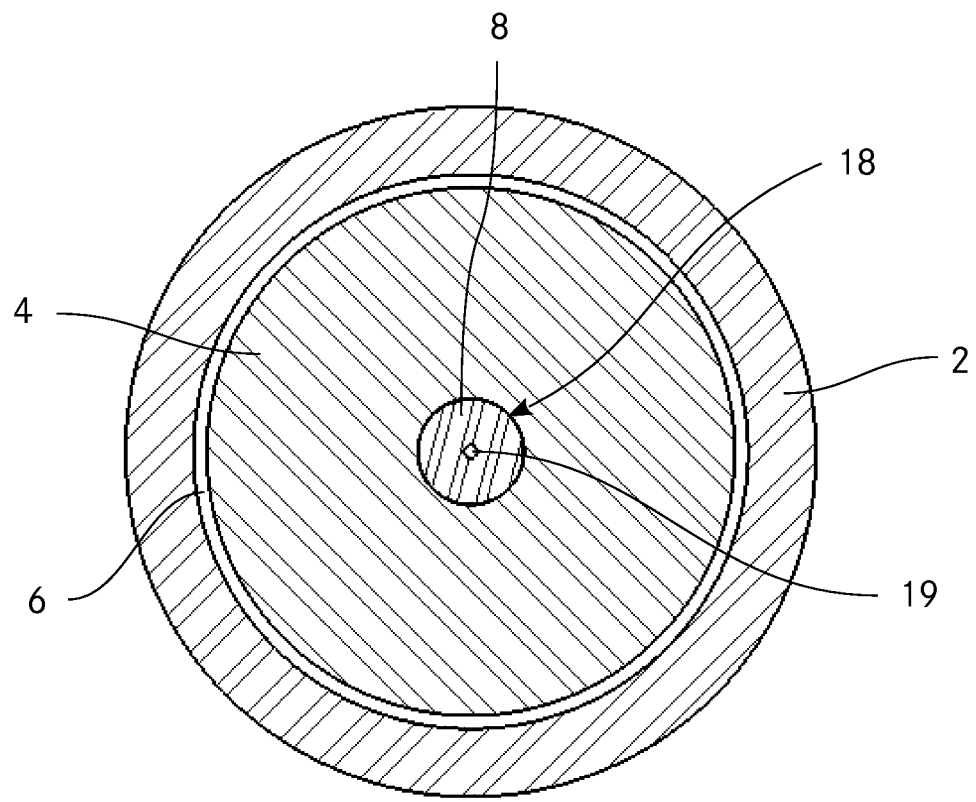
FIG. 11 a cross-section B-B of an embodiment of the device as shown in FIG. 1 in a plane perpendicular to said jet axis with a single connection passage.

FIG. 11 is a cross-section of an embodiment of the device 1 as shown in FIG. 1 in a plane B-B perpendicular to said jet axis A. As may be seen, the second cross section area S2 or the connection passage 6 have an annular shape. Further, in this figure, the arrangement of the nozzle 8 and the outlet 18 of the acceleration chamber 7 may be recognized. Note that the nozzle 8 has a nozzle hole 19 coaxial with said jet axis A.

Figure 12:
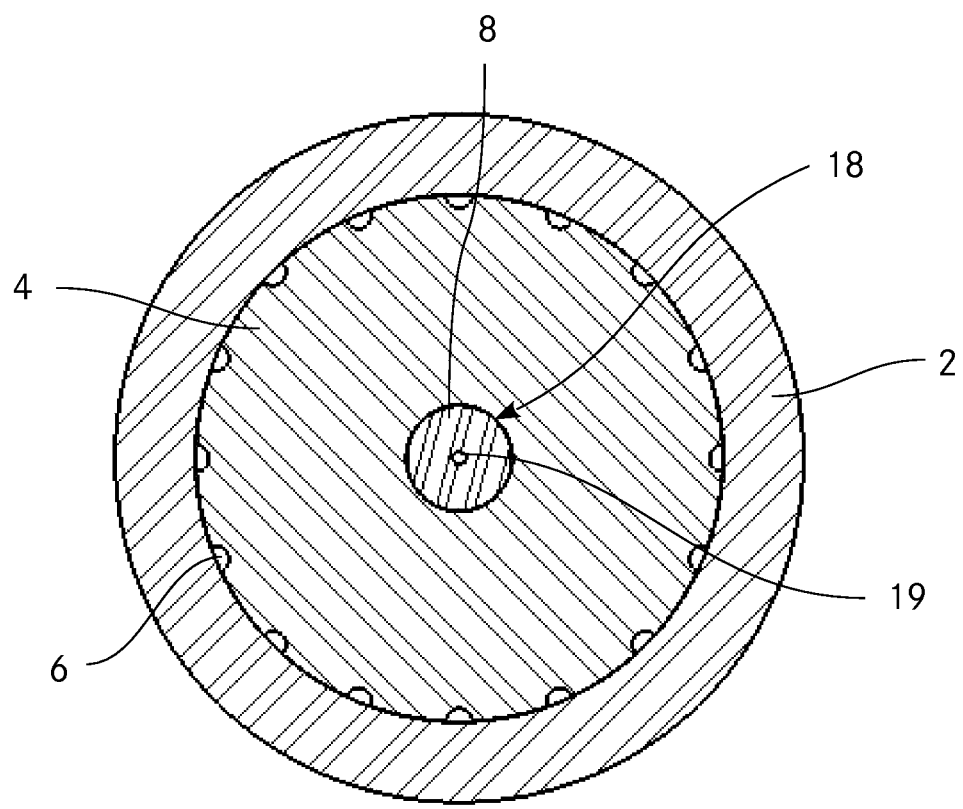
FIG. 12 a cross-section of an alternative embodiment of the device in a plane perpendicular to said jet axis with a multitude of semi-circular connection passages.
Figure 13:
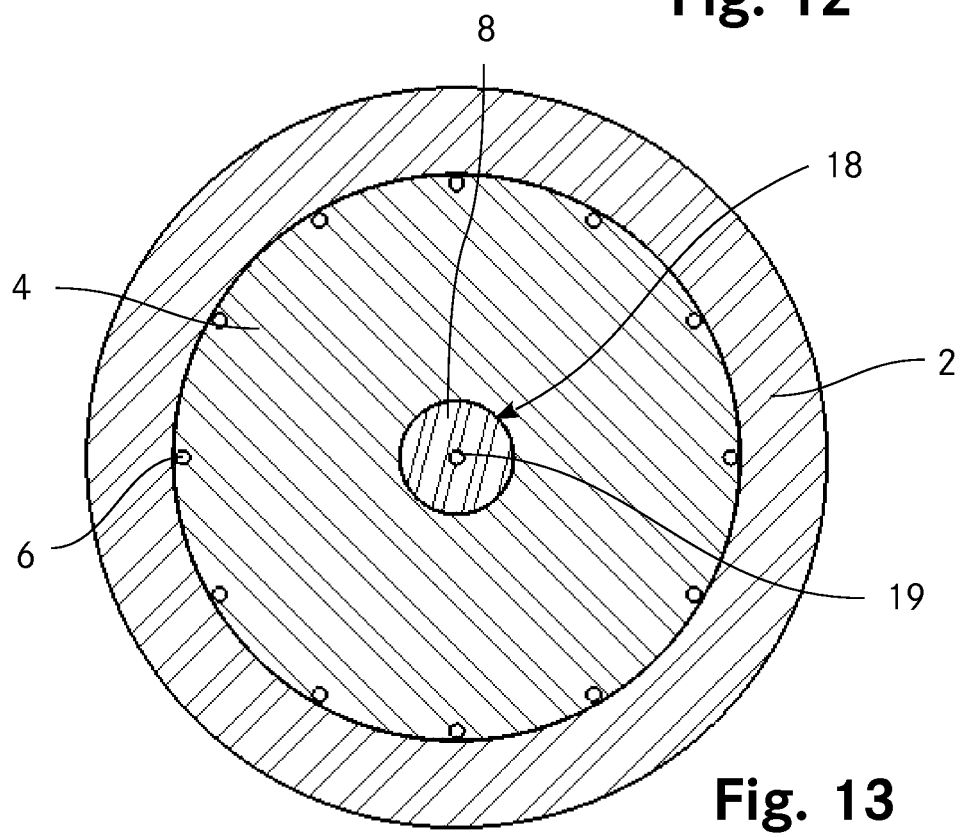
FIG. 13 a cross-section of an alternative embodiment of the device in a plane perpendicular to said jet axis with a multitude of circular connection passages.

FIGS. 12 and 13 show alternative embodiments of an inventive device 1 having multiple connection passages 6 and hence multiple inlets 12 (not shown in FIGS. 12 and 13). In the embodiment as shown in FIG. 12, the connection passages 6 have a semi-circular shape. In the embodiment as shown in FIG. 13, the connection passages 6 have a circular shape.

The invention claimed is:

1. A device for generating a jet of liquid propagating along a jet axis, said jet of liquid guiding a laser beam, said device comprising:
    a) a distribution chamber with at least one inlet and at least one outlet for the liquid, said distribution chamber being of an annular shape encircling said jet axis, said distribution chamber having a first effective liquid flow cross-section area S1;
    b) an acceleration chamber having at least one inlet and one outlet for the liquid and a window transparent to said laser beam to introduce said laser beam into said acceleration chamber through said window, wherein said window is arranged in line with the jet axis to enable the introduction of the laser beam coaxial to said jet axis, said acceleration chamber having an entrance cross-section S3 defined by a surface area of a cylinder barrel of a geometric cylinder arranged coaxially to the jet axis, said cylinder barrel having a radius corresponding to the smallest distance between the jet axis and said at least one inlet of the acceleration chamber, said area of the cylinder barrel being located within said acceleration chamber;
    c) a nozzle with a nozzle hole generating said jet of liquid, said nozzle being arranged in said outlet of the acceleration chamber and said nozzle hole defining a direction of the jet axis;
    d) a connection passage extending from the at least one outlet of the distribution chamber to the at least one inlet of the acceleration chamber, said connection passage having a second effective liquid flow cross-section area S2;
    e) the second effective liquid flow cross-section area S2 is smaller than the first effective liquid flow cross-section area S1, by an order of magnitude:

$S2/S1 \ll 1$ and f) the second effective liquid flow cross-section area S2 is smaller than the entrance cross-section S3:

$S2/S3 < 1$ wherein said device comprises a wall element having a central opening, wherein a nozzle holder comprising the nozzle and a window element comprising the window are arranged one above the other within said central opening, said nozzle holder and said window element being spaced from each other along said jet axis, said spacing defining said acceleration chamber, wherein said connection passage and said distribution chamber are formed within said nozzle holder.

2. The device according to claim 1, wherein the connection passage is rotationally symmetric relative to the jet axis.

3. The device according to claim 2, wherein the connection passage consists of at least two ducts having substantially the same shape and dimensions.

4. The device according to claim 2, wherein the connection passage consists of one annular duct which is coaxial to the jet axis.

5. The device according to claim 1, wherein the acceleration chamber has the shape of a circular cylinder having a radius that is greater than a height of the cylinder.

6. The device according to claim 1, wherein the distribution chamber has one inlet.

7. The device according to claim 1, wherein the window is a transparent element forming at least a part of a wall of the acceleration chamber.

8. The device according to claim 5, wherein said height is <1 mm.

* * * * *